US011226289B2

(12) United States Patent
Hao et al.

(10) Patent No.: US 11,226,289 B2
(45) Date of Patent: Jan. 18, 2022

(54) REMOTE SENSING-BASED DETECTION SYSTEM AND METHOD FOR GASEOUS POLLUTANT FROM DIESEL VEHICLE EXHAUST

(71) Applicant: BEIJING INSTITUTE OF TECHNOLOGY, Beijing (CN)

(72) Inventors: Lijun Hao, Beijing (CN); Taihua Qiu, Beijing (CN); Weiqiang Zhang, Beijing (CN); Jianwei Tan, Beijing (CN); Xin Wang, Beijing (CN); Yunshan Ge, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 17/091,228

(22) Filed: Nov. 6, 2020

(65) Prior Publication Data

US 2021/0131964 A1 May 6, 2021

(30) Foreign Application Priority Data

Nov. 6, 2019 (CN) .......................... 201911078222.4

(51) Int. Cl.
*G01N 21/61* (2006.01)
*G01N 21/85* (2006.01)
(Continued)

(52) U.S. Cl.
CPC .............. *G01N 21/61* (2013.01); *G01N 21/85* (2013.01); *G01W 1/02* (2013.01); *G08G 1/017* (2013.01);
(Continued)

(58) Field of Classification Search
CPC ........... G01N 2021/8578; G01N 21/85; G01N 21/61; G01N 21/59; G01W 1/02;
(Continued)

(56) References Cited

U.S. PATENT DOCUMENTS 5,719,396 A * 2/1998 Jack .................... G01N 21/3504
250/338.5
5,877,862 A * 3/1999 Nelson ............... G01N 21/3504
356/436

(Continued)

FOREIGN PATENT DOCUMENTS

CN 207636476 U 7/2018
CN 109297936 A 2/2019
CN 209280565 U 8/2019

OTHER PUBLICATIONS

First Office Action (with English translation) issued in corresponding Chinese Patent Application No. 201911078222.4 dated Jul. 21, 2020, 8 pages.

(Continued)

*Primary Examiner* — Tri T Ton
(74) *Attorney, Agent, or Firm* — MH2 Technology Law Group, LLP

(57) ABSTRACT

The present disclosure provides a remote sensing-based detection system for gaseous pollutant from diesel vehicle exhaust, including: a diesel vehicle exhaust emission measuring device, a main control computer, an information display device, a vehicle driving status monitoring device, a weather monitoring device and a vehicle license plate recognizing device; where the diesel vehicle exhaust emission measuring device, the information display device, the vehicle driving status monitoring device, the weather monitoring device and the vehicle license plate recognizing device are in communication connection with the main control computer, the main control computer is connected to a motor vehicle emission monitoring platform via internet, and the vehicle driving status monitoring device includes a speedometer, an accelerometer or a radar speedometer. Compared with a traditional detection system, the present disclosure uses remote sensing technology for detection of (Continued)

gaseous emission concentration in exhaust from diesel vehicle in real time.

3 Claims, 3 Drawing Sheets

(51) Int. Cl.
*G01W 1/02* (2006.01)
*G08G 1/017* (2006.01)
*G08G 1/052* (2006.01)

(52) U.S. Cl.
CPC ..... *G08G 1/052* (2013.01); *G01N 2021/8578* (2013.01)

(58) Field of Classification Search
CPC ...... G08G 1/017; G08G 1/052; G08G 1/0112; G08G 1/0116; G08G 1/0129; G08G 1/0175; G08G 1/04; G01D 21/02
USPC ................. 702/22–24; 356/39–42, 432–444, 356/335–343
See application file for complete search history.

(56) References Cited

U.S. PATENT DOCUMENTS

| | | | | |
|---|---|---|---|---|
| 5,996,337 A * | 12/1999 | Blosser | ................ | F01N 13/009 60/274 |
| 6,003,307 A * | 12/1999 | Naber | ................... | F01N 13/009 60/274 |
| 6,470,732 B1 * | 10/2002 | Breton | ................... | F01N 13/008 73/114.69 |
| 2009/0164138 A1 * | 6/2009 | Goto | .................. | G01N 21/3504 702/24 |
| 2016/0161456 A1 * | 6/2016 | Risk | ........................ | G01P 13/02 702/24 |

OTHER PUBLICATIONS

First Search issued in corresponding Chinese Patent Application No. 201911078222.4 dated Jul. 14, 2020, 1 page.

Notification to Grant (with English translation) issued in corresponding Chinese Patent Application No. 201911078222.4 dated Nov. 24, 2020, 3 pages.

EPO Global Dossier List of Documents with Dates (https://https://register.epo.org/ipfwretrieve?apn=CN.201911078222.A&lng=en) for Chinese Patent Application No. 201911078222.4, 1 page.

* cited by examiner

US 11,226,289 B2

REMOTE SENSING-BASED DETECTION SYSTEM AND METHOD FOR GASEOUS POLLUTANT FROM DIESEL VEHICLE EXHAUST

CROSS REFERENCE TO RELATED APPLICATIONS

This application claims priority under 35 U.S.C. § 119 to Chinese Patent Application No. 201911078222.4, which was filed on 6 Nov. 2019.

TECHNICAL FIELD

The disclosure relates to the technical field of equipment for detecting motor vehicle exhaust, in particular to a remote sensing-based detection system and method for gaseous pollutant from diesel vehicle exhaust.

BACKGROUND

Remote sensing technology for testing automobile exhaust has been applied in some countries and regions in North America, Europe, and Asia. Currently, main applications can be found in the following aspects:

(1) Identification of high-emission vehicles: experiments have shown that when working conditions of automobiles are known, a remote sensing system for monitoring can be used to identify high-emission vehicles. High-emission vehicles generally account for only 10% of the total number of vehicles, but pollutants emitted by this 10% of vehicles account for 60% or more of total vehicle pollutant emissions. High-emission vehicles identified can be restricted or eliminated, which is one of the most effective ways to control vehicle pollutant emissions and improve air quality.

(2) Finding of clean vehicles: screening of clean vehicles is a new idea in application of remote sensing for monitoring automobile emissions. This idea is proposed to encourage people to choose vehicles with high performance, maintain and overhaul the vehicles regularly to keep the vehicles in excellent working status. Clean vehicles which pass remote sensing detection may apply for exemption from routine annual inspection. This method is suitable for popularization and application.

(3) Entry inspection: an automatic test device for remote measurement of vehicle exhaust can be installed at entrances of urban roads or toll stations to monitor exhaust of entering vehicles, with high pollutant emission vehicles prohibited from entering an emission restriction zone.

Existing detection technology with remote sensing systems for monitoring motor vehicle exhaust is mature in detection of exhaust from gasoline vehicles. However, there is no successful experience of detection technology in detecting gaseous pollutants in exhaust emissions from diesel vehicles. The main reason lies in differences in fuel characteristics of gasoline vehicles and diesel vehicles, which lead to significantly different combustion processes and greatly different excess air coefficients.

After discharged from an end of an exhaust pipe of a motor vehicle during driving, exhaust gases quickly diffuse to form a so-called "smoke plume". People are interested in the concentration of each component in the exhaust gases from the exhaust pipe, since it reflects actual emissions from the engine. However, it is often only possible to measure the concentration of each component in the smoke plume formed by diffusion of exhaust gas from a motor vehicle. Moreover, due to influence of surrounding environment and a diffusion effect, the smoke plume is continuously diluted, and an absolute concentration of each component is also changing continuously. In order to eliminate the influence of smoke plume diffusion on the concentration of each component in the exhaust gas, a combustion equation is introduced to obtain the concentration upon discharge from an exhaust pipe mouth.

For the same exhaust plume, relative volume concentration ratios of various components in the exhaust are the same at different positions respectively. When $CO_2$ is used as a reference gas, the relative volume concentration ratios of CO, HC and NO to $CO_2$ are approximately constant. In a combustion process of a gasoline engine of a gasoline vehicle, usually a mixed gas with a theoretical air-fuel ratio or a rich mixed gas is present, and generally incomplete combustion is seen, with very little residual oxygen in the exhaust. Therefore, assuming that there is no residual oxygen in the exhaust, and according to a standard combustion equation, the following can be obtained:

$$CH_2 + m(0.21O_2 + 0.79N_2) \rightarrow \qquad (1)$$
$$aCO + bH_2O + cC_4H_6 + dCO_2 + eNO + \left(0.79m - \frac{e}{2}\right)N_2.$$

The formula uses 1,3-butadiene ($C_4H_6$) to represent remaining HC in the exhaust after combustion for the reason that, absorption of light by HC in the exhaust is equivalent to that by 1,3-butadiene, and that it may reduce pollution. In a real-time monitoring process, it is necessary to fill a corresponding HC gas to a monitoring light path in a system to calibrate the system, and then discharge the gas into the air from the system. Use of 1,3-butadiene can relatively reduce the HC discharged into the air. Relative volume concentration ratio coefficients of each components in an exhaust plume are defined as follows:

$$Q = \frac{CO}{CO_2} = \frac{a}{d} \qquad (2)$$

$$Q' = \frac{HC}{CO_2} = \frac{c}{d} \qquad (3)$$

$$Q'' = \frac{NO}{CO_2} = \frac{e}{d}. \qquad (4)$$

According to the law of conservation of mass, a final formula can be obtained based on conservation of carbon atom, hydrogen atom and oxygen atom:

Finally, a volume percentage concentration of $CO_2$ in the exhaust can be obtained:

$$\% CO_2 = \frac{42}{2.79 + 2Q + 1.21Q' + Q''} \qquad (5)$$

Accordingly, volume percentage concentrations of CO, HC and NO in the exhaust can be obtained:

$$\% CO = \% CO_2 * Q \qquad (6)$$

$$\% HC = \% CO_2 * Q' \qquad (7)$$

$$\% NO = \% CO_2 * Q'' \qquad (8).$$

Based on the above formulas and measured relative volume concentration ratio of each component in the exhaust plume, true volume concentration values of gasoline vehicle exhaust emissions can be obtained through inversion.

However, in a diesel engine combustion process of diesel vehicles, an excess air coefficient is always greater than 1 and there is a large quantity of excess air. Gaseous pollutant concentrations in exhaust of diesel vehicles reversely calculated by formulas (5), (6), (7) and (8) may be greatly different from emission concentrations in an exhaust pipe, which greatly affects detection accuracy of a remote sensing method for measuring diesel vehicle emissions.

Therefore, how to provide a remote sensing method and system for measuring diesel vehicle emissions with relatively high detection accuracy is a current critical problem to be solved for practitioners in the industry.

SUMMARY

In view of the above problems, the present disclosure provides a remote sensing-based detection system and method for gaseous pollutant from diesel vehicle exhaust. The system is based on remote sensing detection data and calculation in a reverse manner. It can accurately measure concentrations of gaseous exhaust pollutants in exhaust from diesel vehicles in real time.

In a first aspect, an embodiment of the present disclosure provides a remote sensing-based detection system for gaseous pollutant from diesel vehicle exhaust, including: a diesel vehicle exhaust emission measuring device, a main control computer, an information display device, a vehicle driving status monitoring device, a weather monitoring device and a vehicle license plate recognizing device;

where the diesel vehicle exhaust emission measuring device, the information display device, the vehicle driving status monitoring device, the weather monitoring device and the vehicle license plate recognizing device are in communication connection with the main control computer, the main control computer is connected to a motor vehicle emission monitoring platform via internet, and the vehicle driving status monitoring device includes a speedometer, an accelerometer or a radar speedometer.

Further, the diesel vehicle exhaust emission measuring device adopts a vertical or horizontal light path and may be arranged along a vehicle passing area;

the diesel vehicle exhaust emission measuring device includes a detection light emitting device and a detection light receiving device that are arranged oppositely, in which the detection light emitting device is used for emitting detection light and the detection light receiving device is used for receiving detection light which passes through an exhaust plume and analyzing pollutant concentrations in the exhaust plume from a motor vehicle based on intensity of received detection light.

Further, the information display device is a highlight spot array screen, which is used to display relevant information of a vehicle under inspection in real time, in which the relevant information includes: license plate number, vehicle velocity and exhaust pollutant concentration.

Further, the weather monitoring device is a miniature weather station arranged along a vehicle passing area to measure environmental parameters.

In a second aspect, an embodiment of the present disclosure also provides a remote sensing-based detection method for gaseous pollutant from diesel vehicle exhaust, including:

establishing a map model of excess air coefficient of diesel vehicle based on statistical analysis results of excess air coefficients of diesel engines of a large number of diesel vehicles during driving, calculating an excess air coefficient of a diesel vehicle under current driving conditions by two-dimensional interpolation based on the map model of excess air coefficient, obtaining concentration ratios Q, Q' and Q" of CO, HC and NOx to $CO_2$ in an exhaust plume of the diesel vehicle through a diesel vehicle exhaust emission measuring device, calculating CO, HC, NOx, and $CO_2$ emission concentrations in exhaust of the diesel vehicle based on the excess air coefficient of the diesel vehicle under the current driving conditions and the concentration ratios Q, Q' and Q" of CO, HC and NOx to $CO_2$ in the exhaust plume.

Further, the establishing a map model of the excess air coefficient of diesel vehicle includes:

establishing a map model of excess air coefficient with velocity and acceleration of diesel vehicle as parameter variables, in which each node determined by velocity $v_i$ and acceleration $a_j$ corresponds to an excess air coefficient $\alpha_{ij}$ value, or establishing a map model of excess air coefficient with velocity and vehicle specific power (VSP) of diesel vehicle as parameter variables, in which each node determined by velocity $v_i$ and $VSP_j$ corresponds to an excess air coefficient $\alpha_{ij}$ value.

Further, the VSP is instantaneous power per unit mass of vehicle calculated as follows:

$$VSP = \left[ \frac{C_D A_f}{m_v} \frac{\rho_a}{2} (v \pm v_w)^2 + gC_R + a(1 + \varepsilon_i) + g\sin\varphi \right] v. \tag{9}$$

In the formula, $C_D$ is a dimensionless resistance coefficient, $A_f$ is a windward area of vehicle in $m^2$, $\rho_a$ is an air density, v is a vehicle velocity in km/h, $v_w$ is a wind velocity in km/h having a positive value when in a direction opposite to a driving direction of the vehicle and otherwise a negative value, g is acceleration of gravity which is 9.8 $m/s^2$, $C_R$ is a tire rolling resistance coefficient which is dimensionless, a is vehicle acceleration in $m/s^2$, $\varepsilon_i$ is a mass conversion coefficient of rotating parts of powertrain, φ is a road gradient, and $m_v$ is vehicle mass in kg.

Further, the calculating CO, HC, NOx, and $CO_2$ emission concentrations in exhaust of the diesel vehicle based on the excess air coefficient of the diesel vehicle under the current driving conditions and the concentration ratios Q, Q' and Q" of CO, HC and NOx to $CO_2$ in the exhaust plume includes:

based on facts that an excess air coefficient in a combustion process of a diesel engine of a diesel vehicle is greater than 1 and there is a large quantity of excess air, applying the following combustion equation:

$$CH_2 + m(0.21O_2 + 0.79N_2) \rightarrow \tag{11}$$
$$aCO + bH_2O + cC_4H_6 + dCO_2 + eNO + \left(0.79m - \frac{e}{2}\right)N_2 + xO_2;$$

expressing an excess air coefficient by the following equation:

$$\alpha = \frac{0.42m}{(a+b+2d+e)}; \tag{12}$$

according to the law of conservation of mass, obtaining a final formula based on conservation of carbon atom, hydrogen atom and oxygen atom, that is, obtaining a $CO_2$ volume percentage concentration by:

$$\% \ CO_2 = \frac{100}{0.5Q' - 0.5 + 2.38\alpha(2Q + Q' + 3 + Q'')}, \quad (13)$$

where in formula (13), $\alpha$ is an excess air coefficient of diesel engine of diesel vehicle under test conditions, Q, Q' and Q'' are relative volume concentration ratios of CO, HC and NO to $CO_2$ in exhaust plume obtained by remote sensing respectively, accordingly, calculating volume percentage concentrations of CO, HC and NO in exhaust of diesel vehicle by:

$$\% \ CO = \% \ CO_2 * Q \quad (14)$$

$$\% \ HC = \% \ CO_2 * Q' \quad (15)$$

$$\% \ NO = \% \ CO_2 * Q'' \quad (16).$$

According to specific embodiments of the present disclosure, the present disclosure has the following technical effects:

The present disclosure provides a remote sensing-based detection system for gaseous pollutant from diesel vehicle exhaust, including: a diesel vehicle exhaust emission measuring device, a main control computer, an information display device, a vehicle driving status monitoring device, a weather monitoring device and a vehicle license plate recognizing device; where the diesel vehicle exhaust emission measuring device, the information display device, the vehicle driving status monitoring device, the weather monitoring device and the vehicle license plate recognizing device are in communication connection with the main control computer, the main control computer is connected to a motor vehicle emission monitoring platform via internet and the vehicle driving status monitoring device includes a speedometer, an accelerometer or a radar speedometer. Compared with a traditional detection system, the present disclosure uses remote sensing technology for detection to enable a fast detection speed, reducing time and effort and greatly improving work efficiency. With the present disclosure, monitoring can be implemented during normal driving of automobiles, and working conditions of automobile engines can be better detected during the monitoring to reflect actual automobile exhaust emissions compared with a traditional contact measuring method. The present disclosure avoids an individual driver taking certain measures to artificially affect detection results in order to pass the detection and measures gas emissions in diesel vehicle exhaust in real time.

Other features and advantages of the disclosure will be described in the following description, and some of these will become apparent from the description or be understood by implementing the disclosure. Objectives and other advantages of the disclosure can be implemented or obtained by structures specifically indicated in the written description, claims, and accompanying drawings.

The technical solutions of the present disclosure are further described in detail below with reference to the accompanying drawings and embodiments.

BRIEF DESCRIPTION OF THE DRAWINGS

The accompanying drawings are used to provide further understanding of the present disclosure and constitute a part of the specification. The accompanying drawings, together with the embodiments of the present disclosure, are used to explain the present disclosure but do not pose a limitation to the present disclosure. In the accompanying drawings.

DETAILED DESCRIPTION

Exemplary embodiments of the disclosure will be described below in more detail with reference to the accompanying drawings. Although the accompanying drawings show exemplary embodiments of the disclosure, it should be understood that the disclosure may be implemented in various forms and should not be limited to the embodiments set forth herein. On the contrary, these embodiments are provided so that the disclosure will be more fully understandable, and will fully convey the scope of the disclosure to those skilled in the art.

Example 1

Figure 1:
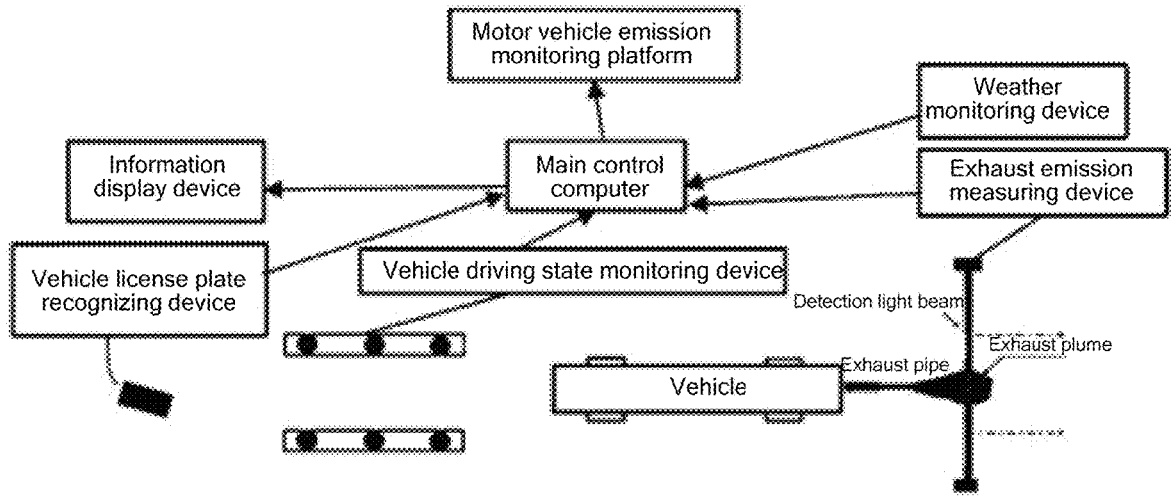
FIG. 1 is a structural block diagram showing the remote sensing-based detection system for gaseous pollutant from diesel vehicle exhaust provided by an embodiment of the present disclosure.

As shown in FIG. 1, an embodiment of the present disclosure provided a remote sensing-based detection system for gaseous pollutant from diesel vehicle exhaust, including: a diesel vehicle exhaust emission measuring device, a main control computer, an information display device, a vehicle driving status monitoring device, a weather monitoring device and a vehicle license plate recognizing device.

The diesel vehicle exhaust emission measuring device, the information display device, the vehicle driving status monitoring device, the weather monitoring device and the vehicle license plate recognizing device were in communication connection with the main control computer, and the main control computer was connected to a motor vehicle emission monitoring platform via internet.

The vehicle driving status monitoring device included a speedometer, an accelerometer or a radar speedometer arranged beside a road defining a vehicle detection area. When vehicles passed by, the device accurately measured velocity and acceleration of the a vehicle under inspection. The diesel vehicle exhaust emission measuring device adopted a vertical or horizontal light path and was arranged along a vehicle passing area. The diesel vehicle exhaust emission measuring device included a detection light emitting device and a detection light receiving device that were arranged oppositely. The detection light emitting device was used for emitting detection light. The detection light receiving device was used for receiving detection light which passed through an exhaust plume and analyzing pollutant concentrations in the exhaust plume from a motor vehicle based on intensity of received detection light. The diesel vehicle exhaust emission measuring device obtained concentrations of pollutants in the exhaust plume of the diesel vehicle based on spectral intensities of emitted detection light and received detection light and attenuation degree of the received detection light.

The vehicle driving status monitoring device may also include a speedometer, an accelerometer and a radar speedometer.

The above information display device was a highlight spot array screen, which can display information of a vehicle under inspection in real time, including information such as license plate number, vehicle velocity and exhaust pollutant concentration. The above weather monitoring device was a miniature weather station which was also arranged along a vehicle passing area. It can precisely measure environmental parameters such as wind speed, wind direction, temperature, and humidity.

The vehicle license plate recognizing device was a high-velocity camera which can accurately obtain license plate information. Other image recognizing equipment capable of obtaining license plate information can also be used, which was not limited by the present disclosure. The main control computer was an industrial control computer responsible for all input and output signal acquisition and processing, as well as system calibration and the like. It also calculated vehicle velocity, acceleration (or VSP), exhaust emission and the like. It sent data to and communicated with the motor vehicle emission monitoring platform through the internet.

In this example, the vehicle driving status monitoring device measured velocity and acceleration of a diesel vehicle. The main control computer used the velocity and the acceleration (or the VSP) of the diesel vehicle as parameters, and calculated the excess air coefficient of the diesel vehicle under the current driving conditions by interpolating a map table of excess air coefficient of the diesel vehicle. At the same time, the diesel vehicle exhaust emission measuring device obtained emission concentration ratios of CO, HC, and NOx to $CO_2$ in the exhaust plume. CO, HC, NOx, and $CO_2$ emission concentrations in exhaust of the diesel vehicle were calculated based on the excess air coefficient of the diesel vehicle under the current driving conditions and the emission concentration ratios of CO, HC and NOx to $CO_2$ in the exhaust plume. Thereby, gas emissions in diesel vehicle exhaust were measured in real time. This system was suitable for exhaust emission detection of various motor vehicles equipped with diesel engines, and was convenient in operation, fast and efficient.

This remote sensing system for detecting gaseous exhaust pollutants from diesel vehicles adopted remote sensing technology for detection, enabling a fast detection speed. The system can detect thousands of vehicles in 1 h, reducing time and effort, and greatly improving work efficiency. Moreover, monitoring can be implemented during normal driving of diesel automobiles, and working conditions of automobile diesel engines can be better detected during the monitoring to reflect actual automobile exhaust emissions compared with a traditional contact measuring method. Vehicle emissions can be detected by remote sensing without notice of drivers, avoiding an individual driver taking certain measures to artificially affect detection results in order to pass the detection. Vehicles were usually inspected once a year which was a long cycle, while vehicle emissions can be monitored by remote sensing in real time.

Example 2

Figure 2:
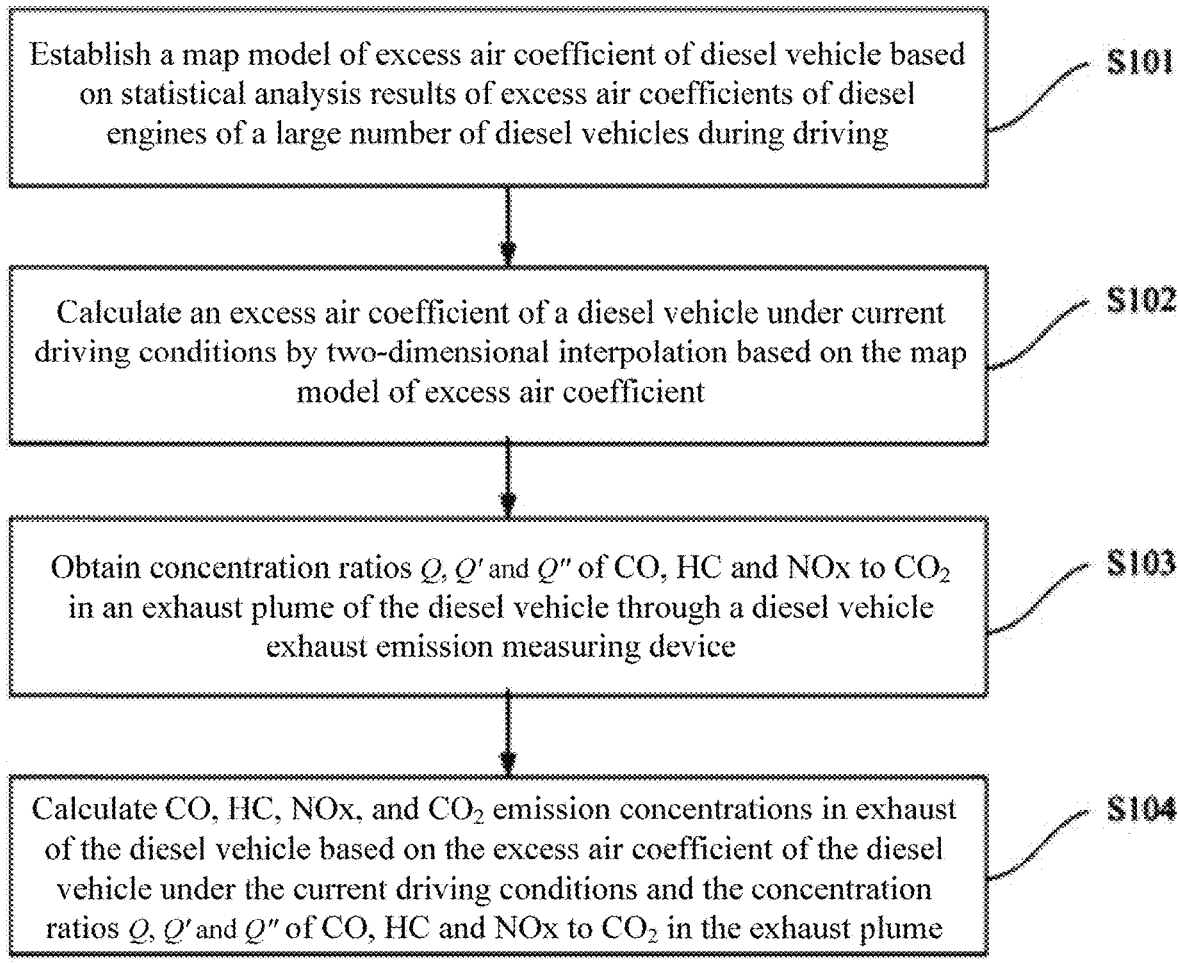
FIG. 2 is a flow chart of the remote sensing-based detection method for gaseous pollutant from diesel vehicle exhaust provided by an embodiment of the present disclosure.

Based on the remote sensing-based detection system for gaseous pollutant from diesel vehicle exhaust provided by Example 1 and as shown in FIG. 2, the disclosure also provided a remote sensing-based detection method for gaseous pollutant from diesel vehicle exhaust, including S101-S104.

S101. a map model of excess air coefficient of diesel vehicle was established based on statistical analysis results of excess air coefficients of diesel engines of a large number of diesel vehicles during driving.

S102. an excess air coefficient of a diesel vehicle under current driving conditions was calculated by two-dimensional interpolation based on the map model of excess air coefficient.

S103. concentration ratios Q, Q' and Q'' of CO, HC, and NOx to $CO_2$ in an exhaust plume of the diesel vehicle was obtained through the diesel vehicle exhaust emission measuring device.

S104. CO, HC, NOx, and $CO_2$ emission concentrations in exhaust of the diesel vehicle were calculated based on the excess air coefficient of the diesel vehicle under the current driving conditions and the concentration ratios Q, Q' and Q'' of CO, HC, and NOx to $CO_2$ in the exhaust plume.

The above steps S101-S102 included a model and a calculation method for excess air coefficient of diesel engines of diesel vehicles during driving.

Figure 3:
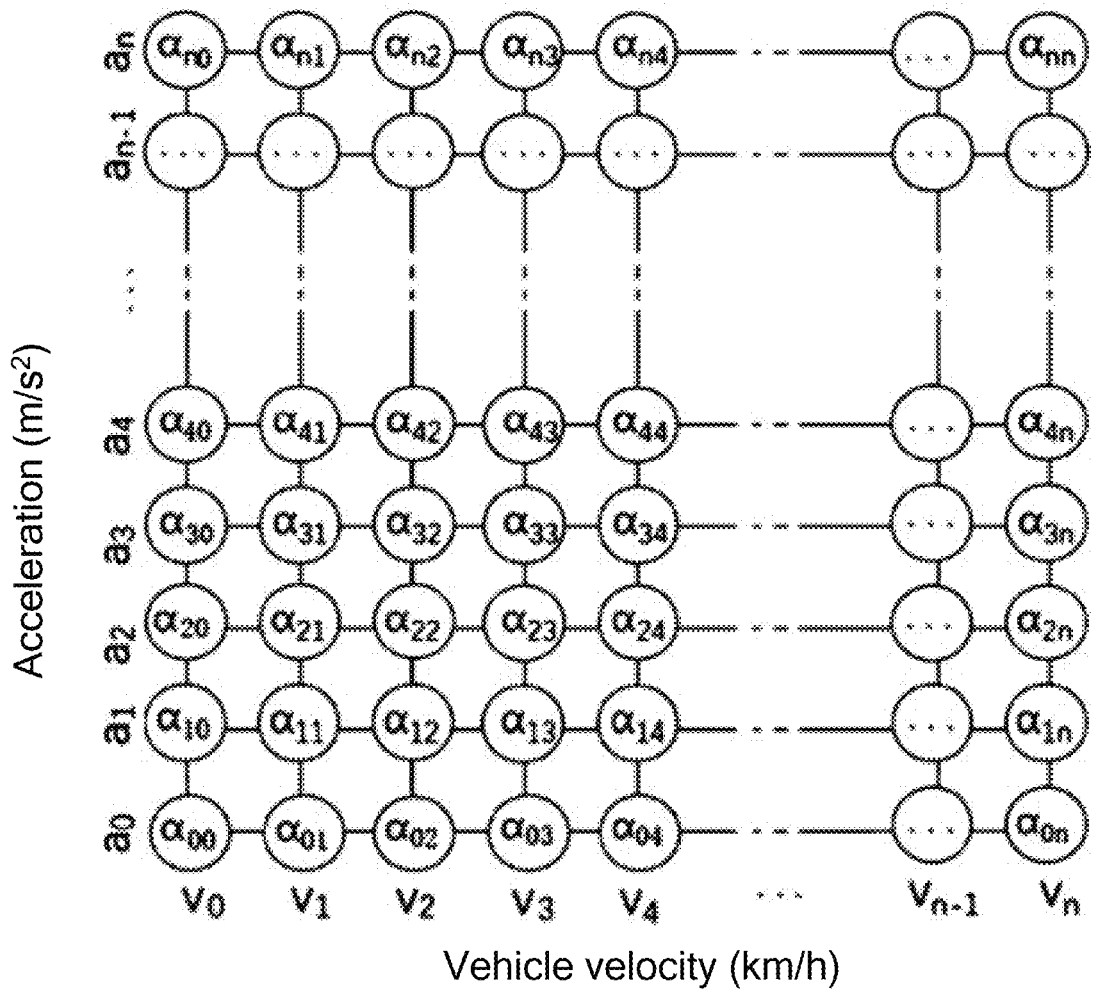
FIG. 3 is a schematic map of excess air coefficient of diesel vehicle with velocity and acceleration as parameters provided by an embodiment of the present disclosure.

Based on statistical analysis results of excess air coefficients of diesel engines of a large number of diesel vehicles during driving, a map model of excess air coefficient with velocity and acceleration of diesel vehicle as parameter variables was established as shown in FIG. 3, in which each node determined by velocity $v_i$ and acceleration $a_j$ corresponded to an excess air coefficient $a_{ij}$ value.

Figure 4:
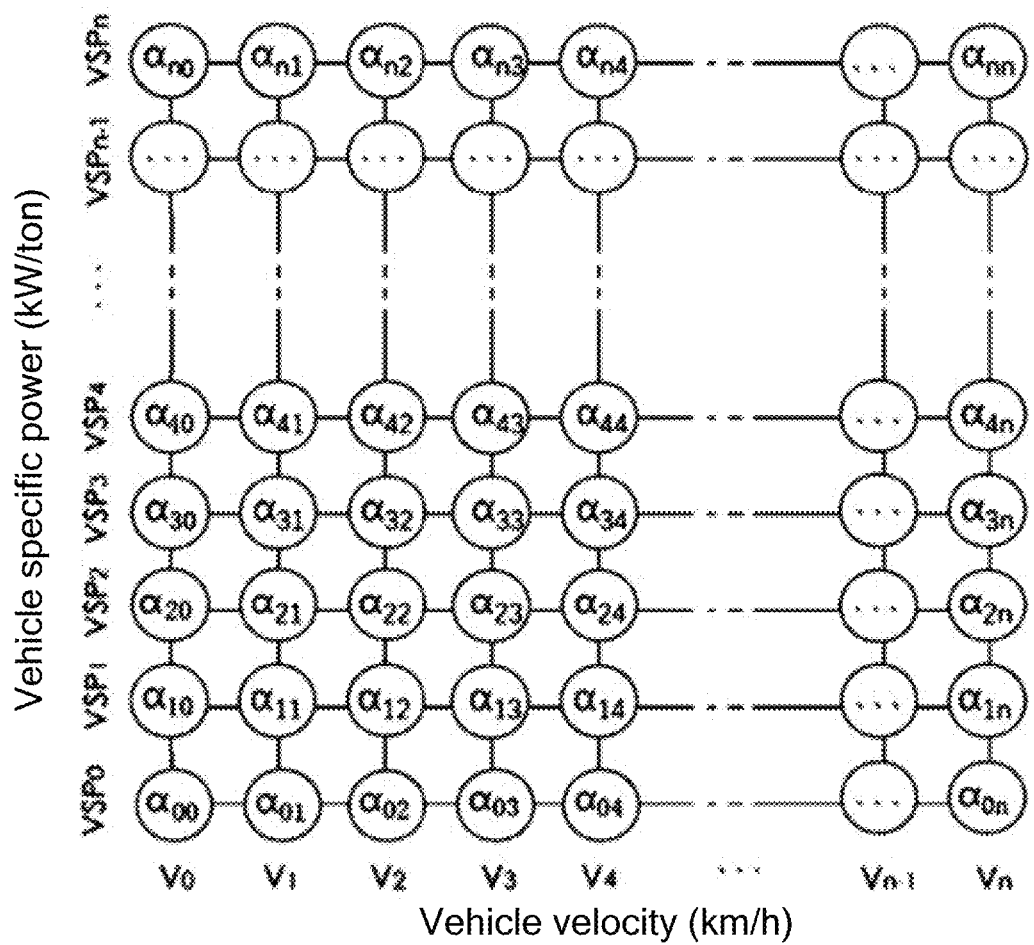
FIG. 4 is a schematic map of excess air coefficient of diesel vehicle with velocity and VSP as parameters provided by an embodiment of the present disclosure.

Or a map model of excess air coefficient with velocity and VSP of diesel vehicle as parameters was established as shown in FIG. 4, in which each node determined by velocity $v_i$ and $VSP_j$ corresponded to a determined excess air coefficient $a_{ij}$ value.

The VSP was instantaneous power per unit mass of vehicle which described instantaneous specific power demand of the vehicle, and was an important parameter characterizing vehicle dynamics. The influence of wind velocity and road gradient can be taken into consideration via the VSP. A calculation method of the VSP was as follows:

$$VSP = \left[\frac{C_D A_f}{m_v} \frac{\rho_a}{2}(v \pm v_w)^2 + gC_R + a(1 + \varepsilon_i) + g\sin\varphi\right]v. \quad (9)$$

In the formula, VSP was vehicle specific power (kW/ton), $C_D$ was a resistance coefficient (dimensionless), $A_f$ was a windward area of vehicle (m²), $\rho_a$ was an air density with 1.207 kg/m³ selected at 20° C., v was a vehicle velocity (km/h), $v_w$ was a wind velocity (km/h, being positive when in a direction opposite to a driving direction of vehicle, otherwise being negative), g was acceleration of gravity (9.8 m/s²), $C_R$ was a tire rolling resistance coefficient (dimensionless), a was vehicle acceleration (m/s²), $\varepsilon_i$ was a mass conversion coefficient of rotating parts (wheel, gear, shaft and the like) of powertrain which varied among different vehicle models and may be 1.05, φ was a gradient of a road known to be detected by the remote sensing system, and $m_v$ was vehicle mass (kg) which can be determined based on license plate recognizing information.

For diesel buses, when the wind velocity was so low that it was negligible, and after substituting typical parameters, a simplified calculation formula of VSP can be used as follows:

$$VSP = v \times (a + g \times \sin(\varphi) + 0.092) + \frac{2.52}{m} \times v^3 \quad (10)$$

where v was a vehicle velocity (m/s), a was acceleration (m/s²), φ was gradient, m was total mass of vehicle (kg) which was equal to curb mass plus load mass.

The vehicle driving status monitoring device detected the velocity and the acceleration of the diesel vehicle. The main control computer used the velocity v and the acceleration a or VSP of the diesel vehicle as two-dimensional parameters, and calculated the excess air coefficient of the diesel vehicle under the current driving conditions through two-dimensional interpolation.

Principle and calculation method for detection of gaseous emission concentrations in diesel vehicle exhaust by remote sensing in the above steps S103-S104 were as follows:

The remote sensing-based detection system for gaseous pollutant from diesel vehicle exhaust obtained concentration ratios Q, Q' and Q" of CO, HC, and NOx to $CO_2$ in the exhaust plume from the diesel vehicle through the diesel vehicle exhaust emission measuring device. $CO_2$ emission concentration in exhaust of the diesel vehicle was calculated based on the excess air coefficient of the diesel vehicle under the current driving conditions and the concentration ratios of CO, HC and NOx to $CO_2$. Further, concentrations of CO, HC and NOx in gaseous exhaust from the diesel vehicle were calculated.

During a diesel engine combustion process of diesel vehicles, an excess air coefficient was always greater than 1 and there was a relatively large quantity of excess air. Gas pollutant concentrations in exhaust of diesel vehicles reversely calculated by formulas (5), (6), (7) and (8) were greatly different from emission concentrations in an exhaust pipe, which greatly affected detection accuracy of a remote sensing method for measuring diesel vehicle emissions.

For an exhaust plume from diesel vehicle, relative volume concentration ratios of various components in the exhaust plume were also considered the same at different positions respectively. Therefore, when $CO_2$ was used as a reference gas, the relative volume concentration ratios Q, Q' and Q" of CO, HC, and NO to $CO_2$ were approximately constant.

Since the excess air coefficient in a combustion process of a diesel engine of a diesel vehicle was always greater than 1 and there was a relatively large volume of excess air, the following combustion equation was applied:

$$CH_2 + m(0.21O_2 + 0.79N_2) \rightarrow \quad (11)$$
$$aCO + bH_2O + cC_4H_6 + dCO_2 + eNO + \left(0.79m - \frac{e}{2}\right)N_2 + xO_2.$$

In formula (11), a represented a molar ratio of CO in an exhaust plume of diesel vehicle, b represented a molar ratio of $H_2O$ in an exhaust plume of diesel vehicle, c represented a molar ratio of $C_4H_6$ in an exhaust plume of diesel vehicle, d represented a molar ratio of $CO_2$ in an exhaust plume of diesel vehicle, e represented a molar ratio of NO in an exhaust plume of diesel vehicle, x represented a molar ratio of $O_2$ in an exhaust plume of diesel vehicles, and m was a coefficient.

The excess air coefficient α was expressed by the following equation:

$$\alpha = \frac{0.42m}{(a + b + 2d + e)}. \quad (12)$$

According to the law of conservation of mass, a final formula can be obtained based on conservation of carbon atom, hydrogen atom and oxygen atom:

Finally, a volume percentage concentration of $CO_2$ in the exhaust can be obtained:

$$\% \ CO_2 = \frac{100}{0.5Q' - 0.5 + 2.38\alpha(2Q + Q' + 3 + Q'')}, \quad (13)$$

In the formula, a was an excess air coefficient of diesel engine of diesel vehicle under test conditions, Q, Q' and Q" were relative volume concentration ratios of CO, HC and NO to $CO_2$ in exhaust plume respectively.

Accordingly, volume percentage concentrations of CO, HC and NO in the exhaust can be obtained:

$$\% \ CO = \% \ CO_2 * Q \quad (14)$$

$$\% \ HC = \% \ CO_2 * Q' \quad (15)$$

$$\% \ NO = \% \ CO_2 * Q'' \quad (16).$$

Based on the above formulas, remote sensed relative concentration ratios of various components in a gaseous exhaust plume and the excess air coefficient of diesel vehicle under driving conditions, true volume concentration values of various gases in diesel vehicle exhaust emissions can be reversely calculated.

Example 3

Figure 5:
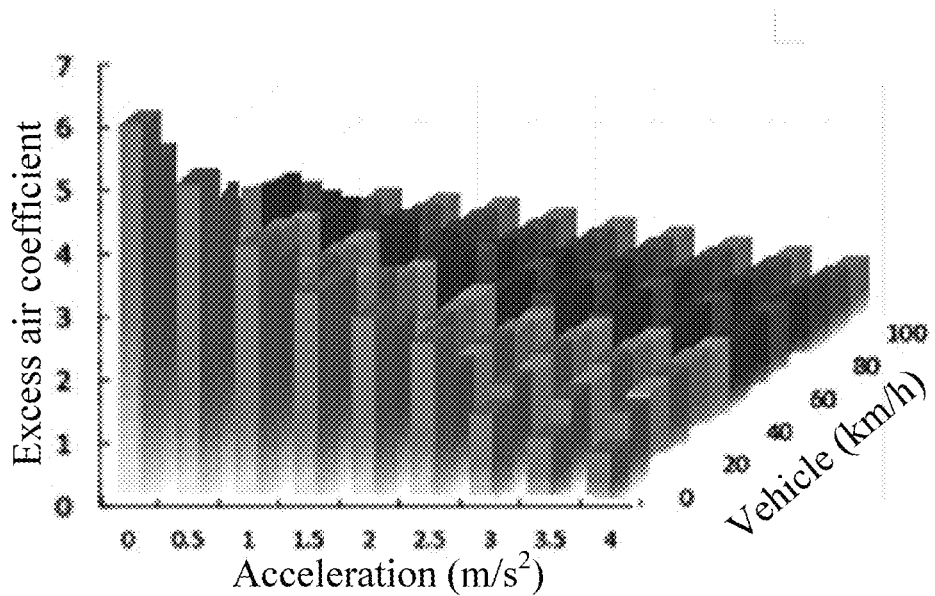
FIG. 5 is another schematic map of excess air coefficient of diesel vehicle with velocity and acceleration as parameters provided by an embodiment of the present disclosure.

1) model of excess air coefficient of diesel engine of diesel vehicle during driving and calculation method Based on statistical analysis results of excess air coefficients of diesel engines of a large number of diesel vehicles under driving conditions, a map model of excess air coefficient with velocity and acceleration of diesel vehicle as parameter variables was established as shown in FIG. 5, in which each node determined by velocity and acceleration corresponded to an excess air coefficient value.

The vehicle driving status monitoring device detected the velocity and the acceleration of diesel vehicle. The main control computer used the velocity v and the acceleration a of the diesel vehicle as two-dimensional parameters, and calculated the excess air coefficient α of the diesel vehicle under the current driving conditions through two-dimensional interpolation.

2) detection of gaseous emission concentrations in diesel vehicle exhaust by remote sensing and calculation method The remote sensing-based detection system for gaseous pollutant from diesel vehicle exhaust obtained concentration ratios Q, Q' and Q" of CO, HC, and NOx to $CO_2$ in an exhaust plume from the diesel vehicle through the diesel vehicle exhaust emission measuring device. The excess air coefficient under the current driving conditions was calculated. $CO_2$ emission concentration in exhaust of the diesel vehicle and the concentrations of CO, HC and NOx were calculated based on formulas (13), (14), (15) and (16) with results shown in Table 1.

TABLE 1

Calculation results of concentrations of $CO_2$, CO, HC and NOx in gas exhaust of diesel vehicle

| Vehicle velocity (km/h) | Acceleration (m/s²) | Calculated value of excess air coefficient | Concentration ratio obtained by remote sensing | | | Calculated value | | | |
|---|---|---|---|---|---|---|---|---|---|
| | | | Q | Q' | Q" | $CO_2$ (%) | CO (%) | HC (ppm) | NO (ppm) |
| 10 | 2.00 | 2.23 | 0.0144 | 0.0013 | 0.0227 | 6.37 | 0.092 | 81.48 | 1445.70 |
| 20 | 1.50 | 2.35 | 0.0156 | 0.0011 | 0.0174 | 6.04 | 0.094 | 68.11 | 1048.41 |
| 30 | 1.50 | 2.24 | 0.0145 | 0.0010 | 0.0144 | 6.36 | 0.092 | 62.75 | 914.09 |
| 40 | 1.00 | 2.64 | 0.0152 | 0.0012 | 0.0164 | 5.36 | 0.081 | 65.88 | 878.15 |
| 50 | 0.05 | 2.89 | 0.0144 | 0.0013 | 0.0192 | 4.88 | 0.070 | 63.31 | 939.64 |
| 60 | 0.02 | 2.93 | 0.0138 | 0.0010 | 0.0166 | 4.82 | 0.066 | 49.80 | 799.34 |
| 70 | 0.01 | 2.92 | 0.0131 | 0.0009 | 0.0167 | 4.84 | 0.063 | 44.27 | 807.62 |

In the present disclosure, the vehicle driving status monitoring device measured velocity and acceleration of the diesel vehicle. The main control computer used the velocity and the acceleration (or the VSP) of the diesel vehicle as parameters, and calculated the excess air coefficient of the diesel vehicle under the current driving conditions. At the same time, the diesel vehicle exhaust emission measuring device detected concentrations of emissions in the exhaust plume from the diesel vehicle to calculate emission concentration ratios of CO, HC, and NOx to $CO_2$ in the exhaust plume. CO, HC, NOx, and $CO_2$ emission concentrations in exhaust of the diesel vehicle were calculated based on the excess air coefficient of the diesel vehicle under test conditions and the emission concentration ratios of CO, HC and NOx to $CO_2$ in the exhaust plume. Thereby, concentrations of gas emissions in diesel vehicle exhaust were measured in real time. The disclosure was suitable for exhaust emission detection of various motor vehicles equipped with diesel engines, and was convenient in operation, fast and efficient.

Example 4

Based on the remote sensing-based detection system for gaseous pollutant from diesel vehicle exhaust provided by Example 1, the disclosure also provided a remote sensing-based detection method for gaseous pollutant from diesel vehicle exhaust, including the following steps:

A set number of excess air coefficients were collected from diesel engines of diesel vehicles during driving.

A map model of excess air coefficient of diesel vehicle was established based on the set number of excess air coefficients.

An excess air coefficient of a diesel vehicle under current driving conditions was calculated by two-dimensional interpolation based on the map model of excess air coefficient.

The concentration ratios Q of CO to $CO_2$, Q' of HC to $CO_2$ and Q" of NOx to $CO_2$ in an exhaust plume of the diesel vehicle were obtained through the diesel vehicle exhaust emission measuring device.

CO, HC, NOx, and $CO_2$ emission concentrations in exhaust of the diesel vehicle were calculated based on the excess air coefficient of the diesel vehicle under the current driving conditions and the concentration ratios Q of CO to $CO_2$, Q' of HC to $CO_2$ and Q" of NOx to $CO_2$ in the exhaust plume.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A remote sensing-based detection method for gaseous pollutant from a diesel vehicle exhaust, comprising:

establishing a map model of an excess air coefficient of a diesel vehicle based on statistical analysis results of excess air coefficients of diesel engines of a large number of diesel vehicles during driving, calculating an excess air coefficient of a diesel vehicle under current driving conditions by two-dimensional interpolation based on the map model of the excess air coefficient, obtaining concentration ratios Q, Q' and Q" of CO, HC and NOx to $CO_2$ in an exhaust plume of the diesel vehicle through a diesel vehicle exhaust emission measuring device, calculating CO, HC, NOx, and $CO_2$ emission concentrations in the exhaust plume of the diesel vehicle based on the excess air coefficient of the diesel vehicle under the current driving conditions and the concentration ratios Q, Q' and Q" of CO, HC and NOx to $CO_2$ in the exhaust plume;

wherein the calculating CO, HC, NOx, and $CO_2$ emission concentrations in the exhaust plume of the diesel vehicle based on the excess air coefficient of the diesel vehicle under the current driving conditions and the concentration ratios Q, Q' and Q" of CO, HC and NOx to $CO_2$ in the exhaust plume comprises:

given that an excess air coefficient α in a combination process of a diesel engine of a diesel vehicle is greater than 1 and that there is a relatively large quantity of excess air, which is described as $xO_2$ applying a following combustion equation:

$$CH_2 + m(0.21O_2 + 0.79N_2) \rightarrow$$
$$aCO + bH_2O + cC_4H_6 + dCO_2 + eNO + \left(0.79m - \left(\frac{e}{2}\right)\right)N_2 + xO_2,$$

expressing the excess air coefficient α by the following equation:

$$\alpha = \frac{0.42m}{(a+b+2d+e)},$$

wherein m, a, b, c, d, e and x are coefficients in the combustion equation, according to a law of conservation of mass, obtaining a final formula based on conservation of carbon atoms, hydrogen atoms and oxygen atoms, that is, obtaining a $CO_2$ volume percentage concentration by:

$$\% CO_2 = \frac{100}{(0.5Q' - 0.5 + 2.38\alpha(2Q + Q' + 3 + Q''))},$$

wherein $\alpha$ is the excess air coefficient of a diesel engine of a diesel vehicle under test conditions, and Q, Q' and Q'' are relative volume concentration ratios of CO, HC and NO to $CO_2$ in the exhaust plume obtained by remote sensing respectively, and accordingly, calculating volume percentage concentrations of CO, HC and NO in the exhaust plume of a diesel vehicle by:

$\% CO = \% CO_2 * Q,$ $\% HC = \% CO_2 * Q',$ and $\% NO = \% CO_2 * Q''.$

2. The remote sensing-based detection method for gaseous pollutant from a diesel vehicle exhaust according to claim 1, wherein the establishing a map model of the excess air coefficient of the diesel vehicle comprises:

establishing a map model of the excess air coefficient with velocity and acceleration of the diesel vehicle as parameter variables, in which each node determined by velocity $v_i$ and acceleration $a_j$ corresponds to an excess air coefficient $\alpha_{ij}$ value, or establishing a map model of the excess air coefficient with velocity and vehicle specific power (VSP) of the diesel vehicle as parameters, in which each node determined by velocity $v_i$ and $VSP_j$ corresponds to an excess air coefficient $\alpha_{ij}$ value.

3. The remote sensing-based detection method for gaseous pollutant from a diesel vehicle exhaust according to claim 2, wherein the VSP is instantaneous power per unit mass of vehicle calculated as follows:

$$VSP = \left[\frac{C_D A_f}{m_v}\frac{\rho_a}{2}(v \pm v_w)^2 + gC_R + a(1 + \varepsilon_i) + g\sin\varphi\right]v,$$

wherein in the formula, $C_D$ is a dimensionless resistance coefficient, $A_f$ is a windward area of vehicle in $m^2$, $\rho_a$ is an air density, v is a vehicle velocity in km/h, $v_w$ is a wind velocity in km/h having a positive value when in a direction opposite to a driving direction of the vehicle and otherwise a negative value, g is acceleration of gravity which is 9.8 $m/s^2$, $C_R$ is a tire rolling resistance coefficient which is dimensionless, a is vehicle acceleration in $m/s^2$, $\varepsilon_i$ is a mass conversion coefficient of rotating parts of powertrain, $\varphi$ is a road gradient, and $m_v$ is vehicle mass in kg.

* * * * *